April 21, 1970  G. A. TINNERMAN  3,507,182
COMPOSITE PLURAL PART FASTENER
Filed Jan. 27, 1967  3 Sheets-Sheet 1
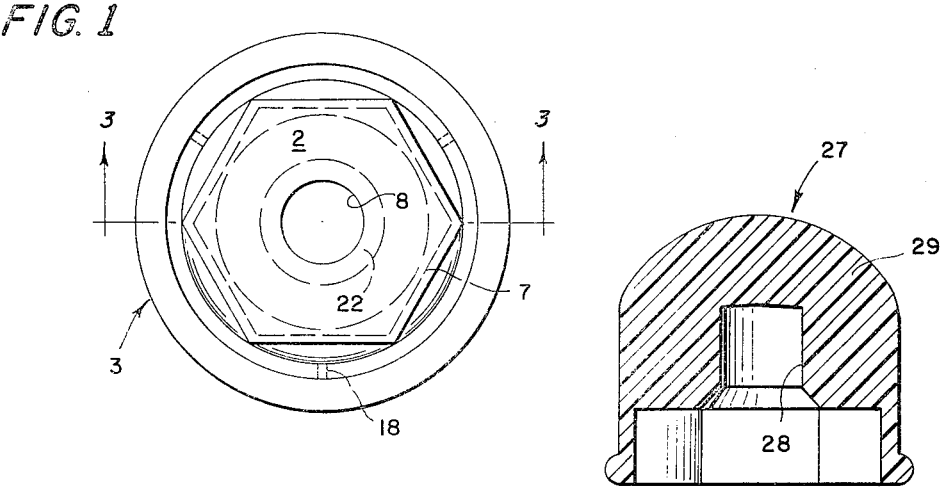
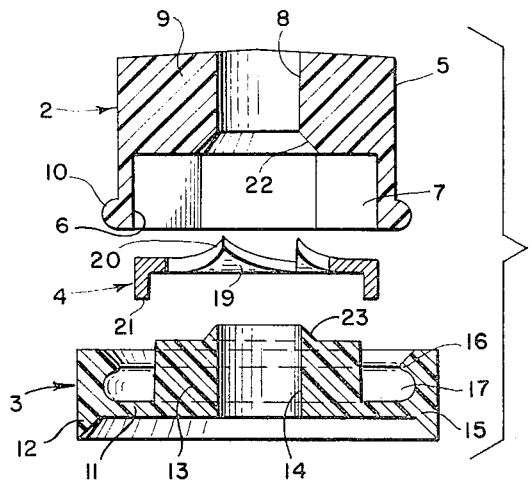
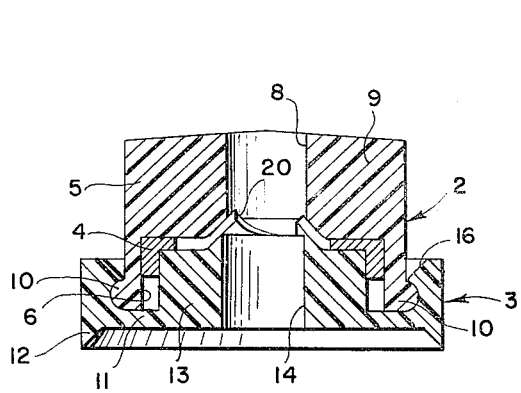
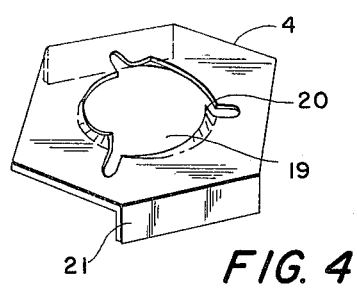
INVENTOR
GEORGE A. TINNERMAN
BY *Arthur H. Hawthorn*
ATTORNEY April 21, 1970     G. A. TINNERMAN     3,507,182
COMPOSITE PLURAL PART FASTENER
Filed Jan. 27, 1967     3 Sheets-Sheet 2

INVENTOR
GEORGE A. TINNERMAN

BY Arthur H. Vauxhorn

ATTORNEY

April 21, 1970     G. A. TINNERMAN     3,507,182
COMPOSITE PLURAL PART FASTENER
Filed Jan. 27, 1967     3 Sheets-Sheet 3

INVENTOR
GEORGE A. TINNERMAN
BY *Arthur H. Vanhorn*
ATTORNEY

United States Patent Office 3,507,182
Patented Apr. 21, 1970

3,507,182
COMPOSITE PLURAL PART FASTENER
George A. Tinnerman, Lakewood, Ohio
(3600 Stewart Ave., Miami, Fla. 33133)
Filed Jan. 27, 1967, Ser. No. 612,147
Int. Cl. F16b 37/00, 37/14
U.S. Cl. 85—32          8 Claims

ABSTRACT OF THE DISCLOSURE

A composite molded plastic and metal stud-engaging fastener is made of a plurality of molded plastic components secured together with a metal nut element confined between them, the two members and the metal nut element having a stud-receiving opening. This fastener engages a stud passing through the opening, as by rotation, so that the metal nut element threads onto a threaded stud or cuts a spiral groove in the surface of a stud, or the metal nut element has stud-engaging elements which grip the stud when pressed thereon.

The invention in this application is an improvement on the invention in Ser. No. 549,880, filed May 13, 1966, which is a continuation-in-part of Ser. No. 387,261, filed July 17, 1964 and now abandoned. This last application relates back to Ser. No. 8,546, which was filed Feb. 15, 1960, now Patent No. 3,120,754, and which was a continuation of Ser. No. 591,244, filed June 13, 1956 and now abandoned as noted in said Ser. No. 549,880.

SUMMARY OF INVENTION

The fastener of this invention combines the advantages of a metal element and a molded plastic body, with the metal element enclosed by the several members constituting the body of the fastener. The metal element provides strength, ease and speed of application and low cost, and the plastic body has the inherent properties of the material selected, which may be simple to manufacture at low cost by molding, may seal when fastened, insulate electrically, and be unaffected by external conditions, such as vibration, extreme temperatures or corrosive substances. The plastic body may also protect the metal nut element against the effect of such conditions, and also assure and augment its holding ability by reenforcement against distortion and prevention of corrosion.

To illustrate the invention, the fastener is composed of a body of molded synthetic resinous plastic composed of a plurality of molded components secured together and confining a metal nut element formed to engage a stud extending into the fastener. The metal nut element may, for example, engage the stud resiliently when pressed on, engage the threads of a threaded stud, or cut a groove upon relative rotation to thread onto the stud. The synthetic resinous plastic body encloses, protects and reenforces the metal element, may act as a wrench element to rotate the nut element, and is unaffected by vibration or corrosion under many conditions, and acts as a sealing member without abrasive action. In special instances where the fastener may be subjected to extremes of heat, as in supersonic or space travel, the inclusion of the metal element in the plastic-like molded material in the form of ceramic or powdered metal such as beryllium would be capable of withstanding extreme heat exposure along with the use of exotic materials such as titanium or columbium in the metal nut element.

THE DRAWINGS

Figure 5:
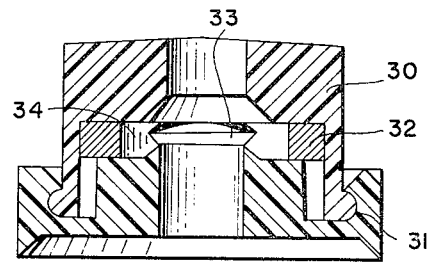
Figure 6:
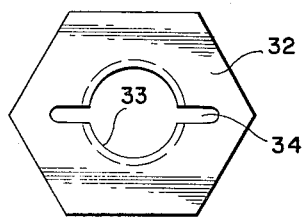
Figure 7:
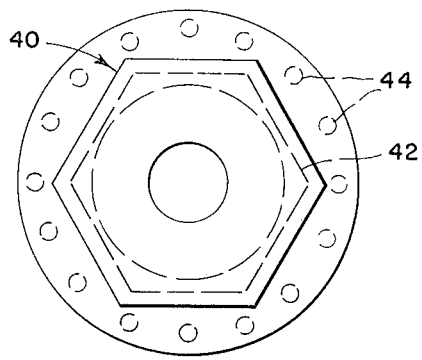
Figure 8:
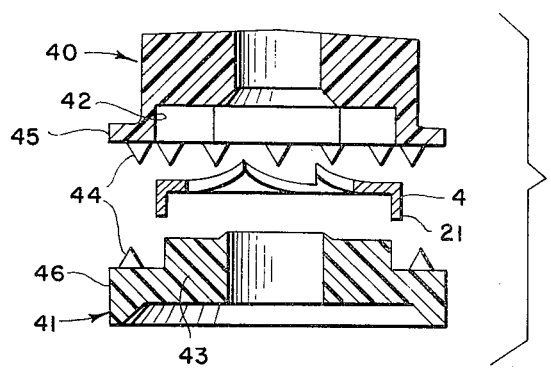
Figure 9:
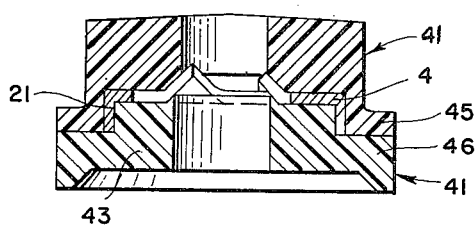
Figure 10:
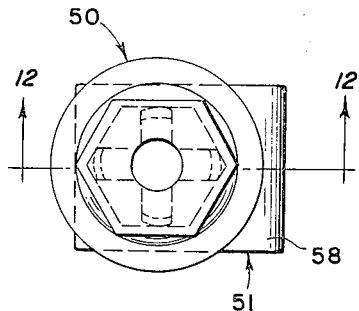
Figure 13:
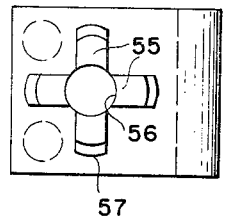
Figure 11:
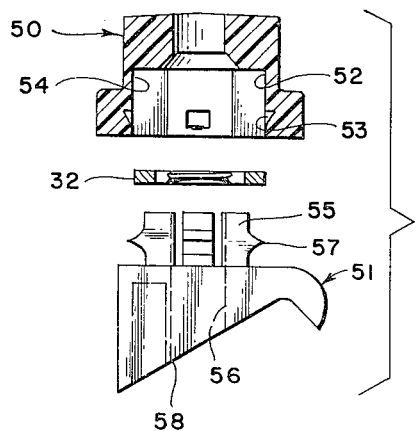
Figure 12:
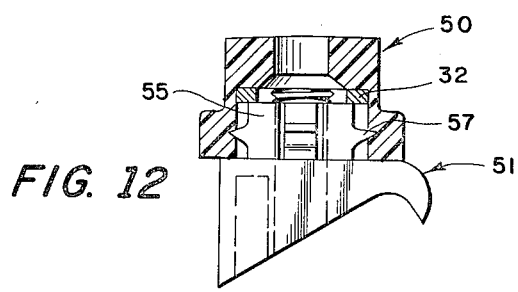

FIGURE 1 is a top plan view of the fastener.
FIGURE 2 is an exploded, axial cross sectional view of the fastener of FIGURE 1, showing the several components before assembly.
FIGURE 3 is a cross sectional view of the fastener on the line 3—3 of FIGURE 1.
FIGURE 3a is a modified form of the cap member of FIGURES 1 to 3.
FIGURE 4 is a perspective view of the nut element.
FIGURE 5 is an axial cross sectional of modified form of fastener.
FIGURE 6 is a plane view of the nut element of FIGURE 5.
FIGURE 7 is a top plan view of another form of fastener.
FIGURE 8 is an exploded, axial cross sectional view of the fastener of FIGURE 7.
FIGURE 9 is an axial cross sectional view of the assembled fastener of FIGURE 8.
FIGURE 10 is a top plan view of another form of the fastener.
FIGURE 11 is an exploded, axial cross sectional view of the fastener of FIGURE 10.
FIGURE 12 is a cross section of FIGURE 10 on line 12—12 of FIGURE 10.
FIGURE 13 is a top plan view of the base member of the fastener of FIGURE 10.

A combined fastener made up of a synthetic resinous body in two parts with a metal nut element held within the plastic body is shown in FIGURES 1 to 4. The components of the fastener are best illustrated in FIGURE 2, in which the plastic top or cap member 2, and the plastic base member 3 are in position to be assembled with the metal nut element 4 between them, as shown in FIGURE 3.

The synthetic resinous plastic cap member 2 has an outer polygonal periphery as at 5 and an inner polygonal periphery at 6 forming the wall of the recess 7. A stud receiving opening 8 extends into the end wall 9 of the cap 2 from the recess 7 and may extend through or only part way through the wall. At the lower end of the wall of recess 7, an external bead 10 extends about the periphery.

The synthetic resinous plastic base member 3 has a base wall 11 with an axially extending periphery at 12 to provide effective sealing upon contact with the surface of a member against which it is clamped. A circular central projecting portion 13 on the base wall 11 extends into the recess 7 of cap member 2 when assembled, and has an opening 14 aligned with opening 8. Spaced from the central portion 13 is the peripheral wall 15 with an inturned bead 16 to provide a channel 17 between the peripheral wall and central portion. The wall and bead 15 are slit at 18 to provide resilience and to withdraw from the mold.

The metal nut element 4, also shown in FIGURE 4, is formed to be received between the two plastic members and has an opening 19 formed to engage the periphery of a stud. This element may take various forms, some of which are shown in the earlier application Ser. No. 569,478, filed Aug. 1, 1966, now Patent No. 3,456,705 for Groove Cutting Rotating Fastener.

The element 4 shown in FIGURE 4 has the periphery of opening 19 formed with stud-engaging, hardened teeth 20 arranged to lie in a spiral path, so that rotation of the element will cut a groove in a stud and cause the element to thread onto the stud, as shown and described in the above application. The element 4 is polygonal to fit in the polygonal recess 7 of cap member 2 and has flanges 21 which position it on the central portion 13 of base member 3. The teeth 20 on element 4 fit within a flared end 22 of opening 8 in cap member 2 and the base member 3 has a rib 23 on the central portion surrounding the opening 14 and complementary to the flared end 22. In view of variation in surface formation of the metal nut element, portions 22 and 23 must be varied as required, as, for instance, in FIGURE 6.

As will be seen in FIGURE 3, the metal nut element 4 is inserted in the polygonal opening in cap 2 and fits within the polygonal wall 6 with the flanges 21 in engagement with contiguous internal walls of the cap. The cap member 2 and the assembled metal nut element 4 therein may then be pressed onto the base member 3, the bead 10 of the cap member entering the channel 17 on the base member and underlying the bead 16 to secure the plastic members together for relative rotational movement.

The completed fastener as shown in FIGURE 3 acts as a unitary body. The cap member 2 engages the periphery of the polygonal metal nut element and rotates the nut element when the cap member 2 is rotated by a tool engaging the polygonal periphery 5. This nut element is confined between the plastic cap member 2 and plastic base member 3, which restrict distortion of the sheet metal element, thereby increasing its holding power. The plastic members are less susceptible to vibration than metal fasteners and also seal better without additional sealing elements and without abrasive action.

A modified form of cap member is shown in 3a. The cap member 27 is similar to that in FIGURES 1 to 3, except that the opening 28 for the stud is closed at the outer end, the member having a solid end wall 29. This construction provides better protection for the stud and nut element and forms a more efficient seal.

The fastener shown in FIGURES 5 and 6 differs in the form of nut element shown at 32, and the cap member 30 and base member 31 are slightly modified to receive the element 32. The nut element 32 is hardened and has a thread 33 interrupted at notches or breaks 34, so as to cut grooves in a cooperating stud. Nut 32 is polygonal to be received in the polygonal recess in cap member 30. The fastener may be threaded onto a stud in the same manner as in the first embodiment, the thread 33 and notches 34 providing teeth to groove the stud.

A further development is illustrated in FIGURES 7 to 9. The metal nut element 4 is the same as in the first embodiment and fits in a polygonal recess 42 in cap member 40. The flanges 21 of the nut element embrace a central portion 43 on the base member 41. The cap member 40 and base member 41 are initially molded with integral plastic projections 44 on meeting flanges 45, 46. These projections, spaced alternately on the two flanges, are fused in welding the flanges together by ultrasonic energy, in a manner well known in the field of of ultrasonic welding of plastics. When completely assembled and welded, as shown in FIGURE 9, the fastener becomes a unitary, composite body. Fasteners such as those illustrated in FIGURES 7 to 9 would be most particularly fitted to assembly applications where the stud is rotated into engagement with the fastener, and in such instances the base portion of the fasteners would not rotate with respect to the surface to which the fastener is applied.

A further embodiment is shown in FIGURES 10 to 13, the two plastic members being separable. The plastic cap member 50 is polygonal with a polygonal recess 52, and a groove 53 about the inner periphery of the wall 54 of the recess. The base member 51 is molded with a segmental boss structure comprising a plurality of posts 55 about the opening 56, and each post has a laterally projecting rib 57, engageable in the groove 53. The base is contoured at 58 to adapt it to a specific use.

The metal nut element 32 is the same as that shown in FIGURES 5 and 6, and fits in the polygonal recess 52. The posts 55 are received in the recess 52, the ribs 57 engaging resiliently in the groove 53 to secure the plastic members together with the metal nut element between them.

The various forms of the invention illustrated will show that the invention is not dependent on the specific construction of its components. Different metal nut elements may be used to engage a stud by rotation, either with threads or by grooving the stud, or the push-on type of spring nut which may be pressed onto the stud. The bases may conform to the members to be secured. For example, the special contour base in FIGURES 10 to 13 may be a flat or hollow base, and may be smaller than that of FIGURES 1 to 4, which adapts it for locations where space is not available for a larger base. The plastic members may be secured together either separately or integrally, by various means, as exemplified by those illustrated.

This combined plastic metal fastener may be metal nut elements of the form shown in application Ser. No. 549,880, filed May 13, 1966, for Composite Fastener, to engage a threaded stud. The threads of the stud may also thread into the plastic body in the same manner as in that case.

I claim:

1. A composite molded plastic and metal stud-receiving fastener comprising cap and base members of molded plastic material, said members having a stud-receiving opening through said base member and into said cap member with a cavity between said members formed with transverse end walls on said cap and base members, respectively, said base member having a base flange spaced from and extending radially outwardly beyond said transverse wall on said base member, said cap member having a circumferential, polygonal wall forming said cavity extending axially from said transverse wall on said cap member and into engagement with said base flange, said polygonal wall and said base flange, including connecting means between said members to secure said members together to form a body of molded plastic material, and a thin sheet metal polygonal nut element confined within said body in said cavity between said members with its polygonal periphery engaging the polygonal wall of said cavity and with transverse surfaces engaging said transverse walls and having a stud-receiving opening axially aligned with the opening in said members, the periphery of said opening in said metal nut element having a stud-engaging formation to secure said fastener on said stud.

2. A composite plastic and metal stud-engaging fastener comprising interfitting cap and base members of molded plastic material having a stud-receiving opening extending through said base member and into said cap member and including interengaging connecting means to secure said members together to form a plastic body, said cap and base members having opposed walls transverse to said opening, a metal nut element within said plastic body having transverse surfaces in engagement with and confined between said transverse walls of said members and having a stud-receiving opening axially aligned with the opening in said members, said metal nut element being formed to thread onto said stud upon relative rotation, said cap member having an axial polygonal wall surrounding said metal nut element and said nut element being polygonal to fit within said polygonal wall and to have non-rotative engagement with said cap member so that said nut element and said cap member rotate together upon engagement by a tool to secure said fastener on said stud.

3. A composite plastic and metal stud-engaging fastener comprising cap and base members of molded plastic material having a stud-receiving opening through said base member and into said cap member and including means to secure said members together to form a plastic body, said cap member having an axial polygonal wall forming a polygonal recess and an end wall in said recess transverse to said opening and said base member having a boss surrounding said opening extending into said recess and having a transverse wall spaced from the cap member to form a cavity between said two members, a metal nut element confined in said cavity and having transverse surfaces in engagement with said transverse walls and having a stud-receiving opening axially aligned with the opening in said members, said nut element being polygonal to fit within said polygonal wall and to have non-rotative engagement with said cap member so that rotation of said cap member by a tool engaging said polygonal wall rotates said nut element, the periphery of the opening in said nut element being formed for spiral engagement of a stud in said openings so that rotation of said nut element causes threaded engagement of said element onto said stud.

4. A composite plastic and metal stud-receiving fastener comprising synthetic resinous relatively rotatable plastic cap and base members having a stud-receiving opening through said base member and into said cap member, said members having interengaging peripheral rib and groove resiliently engageable to secure said members together, said cap member having a polygonal recess with a transverse wall forming the end of said recess and said base member having a central boss structure surrounding said opening and extending into said recess for relative rotation therein and spaced from the cap member to form a cavity between said two members, a polygonal metal nut element fitting non-rotatively in said polygonal recess and confined in said cavity in engagement with said wall and having a stud-receiving opening axially aligned with the opening in said members, the periphery of said opening in said nut element being formed for spiral engagement of a stud in said openings so that relative rotation of said nut element by said cap member causes threaded engagement of said element onto said stud.

5. A fastener as claimed in claim 4, in which said boss of said base member is formed by a plurality of posts surrounding said opening and projecting into engagement with said nut element in said recess, said means to secure said members together including cooperating rib and groove means on the wall of said recess and on said posts to interengage and secure said members assembled to form said plastic body.

6. A fastener as claimed in claim 4, in which said metal nut element is formed with flanges embracing said central boss structure of said base member to position said nut element relative to said base member.

7. A composite plastic and metal stud-engaging fastener comprising a synthetic resinous plastic body formed of cap and base members having a stud-receiving opening through said base member and into said cap member, said base member having a central boss with a transverse end wall surrounding said opening and the cap member having a complementary recess with a transverse end wall and receiving said central boss, said cap and base members having facing radial flanges extending outwardly from said boss and recess, said flanges being fused together to connect said cap and base members to form a plastic body, a metal nut element in said recess and confined between said members with transverse surfaces engaging said transverse end walls and having a stud-receiving opening axially aligned with the opening in said members, the periphery of said opening in said nut element being formed to engage a stud in said openings to resist displacement on said stud.

8. A fastener as claimed in claim 7, in which said nut element is formed for spiral engagement with a stud received in said opening in the element and has non-rotative engagement with said plastic cap member, so that said nut element threads said fastener onto said stud upon relative rotation of said fastener and stud.

References Cited

UNITED STATES PATENTS

| | | | |
|---|---|---|---|
| 2,417,262 | 3/1947 | Morehouse | 85—36 |
| 2,846,707 | 8/1958 | Strand et al. | 151—7 |
| 2,850,064 | 9/1958 | Rapata | 151—7 |
| 2,969,705 | 1/1961 | Becker | 85—36 |
| 3,300,929 | 1/1967 | Fischer | 85—55 |
| 3,345,899 | 10/1967 | Fiddler | 85—32 |

FOREIGN PATENTS

| | | |
|---|---|---|
| 636,531 | 3/1962 | Italy. |
| 374,858 | 3/1964 | Switzerland. |

EDWARD C. ALLEN, Primary Examiner

U.S. Cl. X.R.

85—35